United States Patent [19]

Fusek et al.

[11] Patent Number: 4,478,481
[45] Date of Patent: Oct. 23, 1984

[54] PRODUCTION OF DIFFRACTION LIMITED HOLOGRAPHIC IMAGES

[75] Inventors: Richard L. Fusek, Dayton; James S. Harris, Centerville; Kevin G. Harding, Dayton, all of Ohio

[73] Assignee: University of Dayton, Dayton, Ohio

[21] Appl. No.: 348,461

[22] Filed: Feb. 12, 1982

[51] Int. Cl.³ .................... G03H 1/02; G03H 1/22
[52] U.S. Cl. ..................... 350/3.83; 350/3.6; 350/3.85; 350/3.86
[58] Field of Search ............. 350/3.6, 3.83, 3.85, 350/3.86, 162.11, 162.12, 162.14

[56] References Cited

U.S. PATENT DOCUMENTS 4,000,949 1/1977 Watkins.
4,299,443 11/1981 Minami et al.

OTHER PUBLICATIONS

Harris et al., *Stroboscopic Interferometer*, Applied Optics, vol. 18, No. 14, Jul. 15, 1979, pp. 2368-2371.
Toth and Collings, "Reconstruction of a Three-Dimensional Microscope Sample Using Holographic Techniques", 13 Appl. Phys. Letters, 7, (1968).
Leith and Upatnieks, "Microscopy by Wavefront Reconstruction", 55, J. Opt. Soc. Americ., 569.

Briones, Heflinger and Wuerker, "Holographic Microscopy", 17, Appl. Optics, 1944, (1978).

*Primary Examiner*—Bruce Y. Arnold
*Assistant Examiner*—William Propp
*Attorney, Agent, or Firm*—Biebel, French & Nauman

[57] ABSTRACT

An apparatus for the production of a holographic image of a subject disposed at a subject plane includes a source of coherent light divided by a beamsplitter into a reference beam and a subject beam. The subject beam is directed towards the subject through a beamsplitter and a quarter-wave plate. The front surface of an opaque subject or a mirror behind a transparent subject reflects the subject beam back through the quarter-wave plate to the beamsplitter where it is deflected towards a photo-sensitive recording medium through an imaging lens. The reference beam is simultaneously directed toward the recording medium at a predetermined angle of incidence. After exposure and development of the medium, it is illuminated from the conjugate direction by the redirected reference beam. Image rays exactly retrace their original paths back through the optical system and provide a three-dimensional real-image reconstruction at the subject plane. The images produced may be microscopically examined or studied through optical processing and interferrometric techniques. A method utilizing the above-described apparatus is also disclosed.

9 Claims, 11 Drawing Figures

PRODUCTION OF DIFFRACTION LIMITED HOLOGRAPHIC IMAGES

The United States government has rights in this invention, pursuant to contract No. F29601-79-C-0027, awarded by the Department of the Air Force.

BACKGROUND OF THE INVENTION

Thoroughly documenting the microstructure present over large object surface areas or in large transparent or semi-transparent volumes is a long, laborious task. This is presently accomplished photographically through the use of high-resolution photography or by recording a large number of photomicrographs. Both of these techniques are disadvantageous, however, because the depth of focus in the image plane of the object is limited for each photographic record.

This problem becomes severe if very high-resolution recordings are desired, since as the resolution of an imaging optic is increased, the depth of focus thereof decreases. Furthermore, it is often desirable to manipulate optical information coming from the subject for the purpose of enhancing detail, removing unwanted subject information, or making precise topographic and optical path measurements. These operations each require the use of specialized apparatus such as the phase-contrast or Nomarski microscopes, optical processors, and interferometers. Each requires the presence of the subject and/or a recorded image of the particular detail of interest on the subject.

Full-field documentation with relatively high resolution can be accomplished through holography. By holographically recording the subject, and then reconstructing the holographic image with the conjugate to the reference beam, a three-dimensional real image of the object is created in space. This real image can then be examined microscopically as if it were the original illuminated object. An added advantage is that a holographic system can document not only reflecting surfaces but also the microstructure inside a thick, transparent object such as optical components. Since the holographic image has no substance, a microscope can focus through the image, even to the opposite side if desired, without the need for a long focus and high quality objective required when a solid object is in the way.

Examples of previous work in holographic microscopy are disclosed in Leith and Upatnieks, "Microscopy by Wavefront Reconstruction," 55 J. Opt. Soc. Amer. 569 (1965); Toth and Collins, "Reconstruction of a Three-Dimensional Microscope Sample Using Holographic Techniques," 13 Appl. Phys. Letters 7 (1968); Briones, Heflinger and Wuerker, "Holographic Microscopy," 17 Appl. Optics 1944 (1978); and Caulfield, ed., *Handbook of Optical Holography*, 565 (Academic Press, 1979). The records produced are large aperture wide field of view, large depth of field, three-dimensional images of both transmitting volumes and specularly or diffuse reflecting subjects. Such work, however, has not as yet obtained both the necessary resolution and field of view for viewing and/or analyzing the microstructure of large object surface areas.

When a hologram 10 is made of a subject 12 through a lens 14 or other optical components, the image information 16 from the subject may be aberrated by the lens 14 (FIG. 1a). If the hologram 10 is repositioned accurately with respect to the lens 14, and the conjugate to the reference beam 18, i.e., the same wavefront as the reference beam but travelling in the opposite direction, is used to reconstruct the holographic image, the image rays 20 will exactly retrace the path of the original subject rays back through the optical system (FIG. 1b). This is not the same as merely turning the lens 14 around, since the information about the lens aberration is stored in the hologram 10. Therefore, the aberrations of the lens 14 will be completely compensated for upon reconstruction and the holographic image 22 will be diffraction limited.

A qualification to this claim of diffraction limitation is that vignetting of the image rays by other apertures in the system will decrease the effective diffraction limit of the system. Even on axis, a focus error aberration can cause loss of spatial frequency information, as illustrated by way of example for a typical optical telescope system in FIG. 2.

A three-lens system 24 is shown, wherein lenses $1_1$ and $1_2$ are F/1.50, 50 mm diameter, 75 mm focal length lenses, and lens $1_3$ is an F/1.50, 150 mm diameter, 225 mm focal length lens. Assuming the sum of the spherical aberration from lenses $1_2$ and $1_3$ to be 2 mm, the focus of the rays 26 entering the system 24 is moved from a point 28 to a point 30, 77 mm away from lens $1_1$. This results in a smaller, F/1.54 collection angle at lens $1_1$.

Therefore, with a 225 mm focal length for lens $1_3$, which would give an F/4.5 collection angle for lens $1_3$ and the system 24 as a whole if lens $1_1$ collected F/1.50, the lens can only collect:

$$\frac{1.50}{1.54} = \frac{4.50}{Y} \quad Y = \frac{(1.54)(4.50)}{1.50} = F/4.62.$$

Similarly, for 1 mm of special aberration, the focal point is moved to 76 mm away from lens $1_1$ and:

$$Y = \frac{(1.52)(4.50)}{1.50} = F/4.56$$

for the system 24.

To consider these effects directly, the optical transfer function (OTF) of the system may be looked to.

For a diffraction limited system:

$$OTF = H(f_x, f_y) = \frac{\int a(f_x, f_y) d\xi d\eta}{\int a(o,o) d\xi d\eta}$$

where $a(f_x, f_y)$ is the area of overlap of the pupil collecting spatial frequencies with the restricting pupil function.

The OTF with aberrations for two pupils given by:

$$P\left(\xi - \frac{\lambda d f_x}{2}, \eta - \frac{\lambda d f_y}{2}\right) \text{ and } P\left(\xi + \frac{\lambda d f_x}{2}, \eta + \frac{\lambda d f_y}{2}\right)$$

is $H'(f_x, f_y) =$ $$\int_{a(f_x, f_y)} \exp\left\{ik\left[W\left(\xi + \frac{\lambda d f_x}{2}, \eta + \frac{\lambda d f_y}{2}\right) - \right.\right.$$

-continued $$\left. W\left(\xi - \frac{\lambda d_i f_x}{2}, \eta - \frac{\lambda d_i f_y}{2}\right)\right]\right\} d\xi d\eta \bigg/ \int_{a(o,o)} d\xi d\eta$$

where W is the aberration function.

The Schwarz inequality, $$|\int\int XY d\xi d\eta|^2 \leq (\int\int |X|^2 d\xi d\eta)(\int\int |Y|^2 d\xi d\eta)$$

can be used to show directly that $$|H(f_x, f_y)_{aber.}|^2 \leq |H(f_x, f_y)|^2 \text{ no aberrations}$$

This means that aberrations never increase the MTF (the modulus of the OTF), but rather lower the contrast of each spatial frequency component. Thus, the cutoff to the spatial frequency passed by the system will be effectively decreased and the effective F-number thereof will increase. This is especially important if there is a random background to further decrease the contrast.

Off-axis, spatial frequency information can be lost even in an ideal aberration-free system directly due to vignetting, as shown in FIGS. 3 and 4. Again, considering the sample three-lens optical system 24, the limit of the system 24 is found by tracing rays from the edge of lens $1_1$. The angle of incidence of these rays at a point on the subject plane 34 gives the cone angle of spatial frequency information which can be collected from that point on the subject.

In FIG. 3, using a thin lens ray trace, it can be seen that only an F/9 cone can be collected by system 24 from a point 36 located 37.5 mm off the axis 37. In FIG. 4, a point 38 located 50 mm off the axis 37 is considered. Again using a thin lens ray trace, it can be seen that only an F/13.5 cone can be collected due to vignetting.

To reconstruct a high-resolution holographic real image, the maximum available spatial frequency information must be collected. If the spatial frequency information never reaches the area of the holographic plate illuminated by the reference beam, the information is lost. For this reason, a simple single-lens, single-large-aperture imaging system would seem the most promising to obtain a high-resolution reconstructed real image.

What is needed, therefore, is such a method and apparatus for production of a holographic record that can be used for documenting detailed characteristics of an object's surface or volume and that can provide for detailed three-dimensional microscopic or macroscopic examination of that object.

SUMMARY OF THE INVENTION

The present invention relates to an apparatus and method for the production of holograms which reproduce diffraction-limited three dimensional images of a subject. When produced on the described apparatus and by the described method, these holographic images can be evaluated using microscopy, interferometry, and optical information processing techniques.

A source for generating a coherent beam of light, preferably an argon ion laser operating single frequency, provides a beam to a beamsplitter that divides the beam into a subject beam and a reference beam. The subject beam is directed to the subject where it is reflected and/or diffracted thereby. The reflected and/or diffracted light from the subject is passed through a lens and focussed in the vicinity of a photo-sensitive material, such as a photographic plate. The reference beam is simultaneously directed onto the plate at a predetermined angle of incidence.

After processing, the hologram is replaced and illuminated with the reference beam which is redirected onto the plate in a direction conjugate to the original reference beam. Subject information from the hologram will then exactly reverse ray trace back through the optical system following the same path but in the reversed direction as original subject rays during recording. A three-dimensional real image of the original subject will be formed at the original subject location. Because of the exact reverse ray-trace feature, optical distortions or aberrations introduced by optical elements in the system will be completely eliminated thus providing a diffraction limited three-dimensional real image.

The apparatus may further include a second beamsplitter disposed along the path of the subject beam, but before the subject, with a quarter-wave-plate disposed between the second beamsplitter and the subject. The beam is passed directly through the beamsplitter to the subject, but the plane of polarization is rotated by the wave plate such that upon reflection by the subject, the beam is deflected by the beamsplitter into the lens.

The apparatus may further include means for microscopically examining the image reconstructed at the subject plane.

This invention offers the following advantages over known systems and methods of producing holographic images.

First, the reverse ray-trace of the image information through the optical system provides an image that is free of aberrations introduced by optical elements.

Second, since such aberrations are eliminated, the optical quality of the imaging optic is not as critical as in known systems. This permits use of components of lesser quality, with significant reductions in costs.

Third, the use of a single, large-aperture lens provides for a wide field-of-view, with little information loss due to vignetting.

Fourth, the high resolution obtained with this invention provides for microscopic evaluation of recorded images, and enhances results obtained through optical processing and interferrometric techniques.

Accordingly, it is an object of the present invention to provide an apparatus and method for the production of holograms; to provide such an apparatus and method for producing holographic images that are free from aberrations due to components of the system; to provide full-field, high-resolution holograms capable of microscopic examination; and to provide such an apparatus and method compatible with optical processing and interferrometric techniques.

Other objects and advantages of the invention will be apparent from the following description, the accompanying drawings, and the appended claims.

DETAILED DESCRIPTION OF THE PREFERRED EMBODIMENTS

Figure 1A:
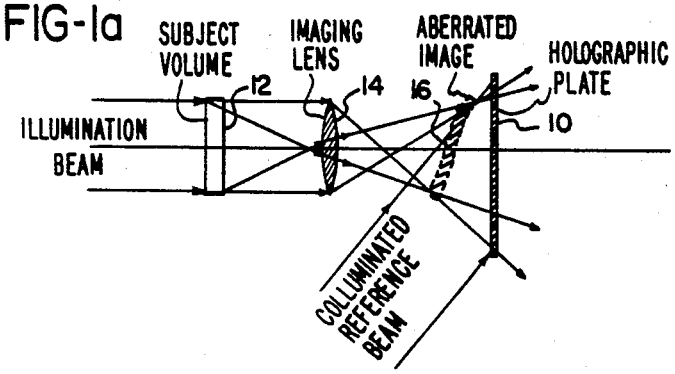
FIG. 1a is a diagram illustrating generally the recording of a hologram, showing introduction of aberration into the image information.
Figure 1B:
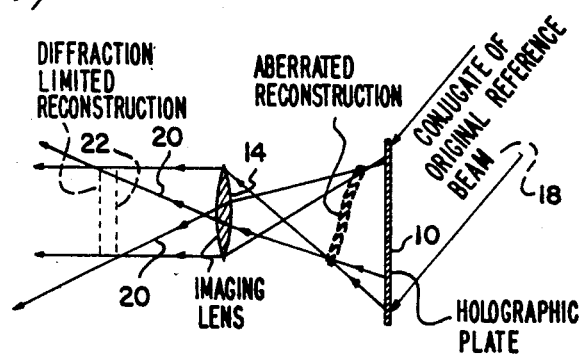
FIG. 1b is a diagram illustrating generally the reconstruction of a holographic image, wherein reverse ray tracing eliminates aberration from the image information.
Figure 5:
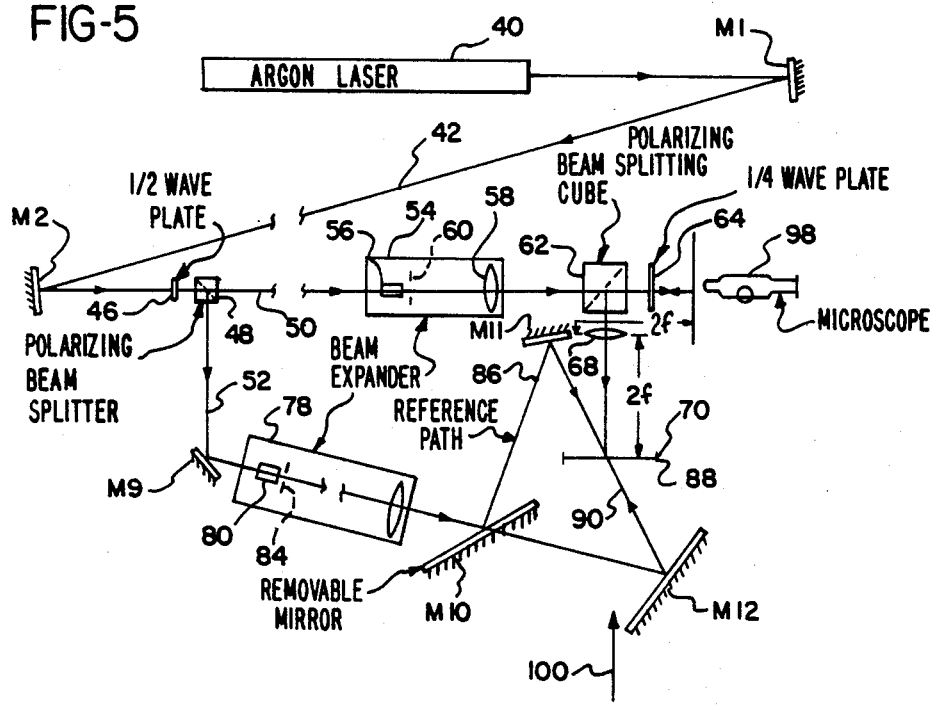
FIG. 5 is a diagram of the apparatus of the present invention.
Figure 2:
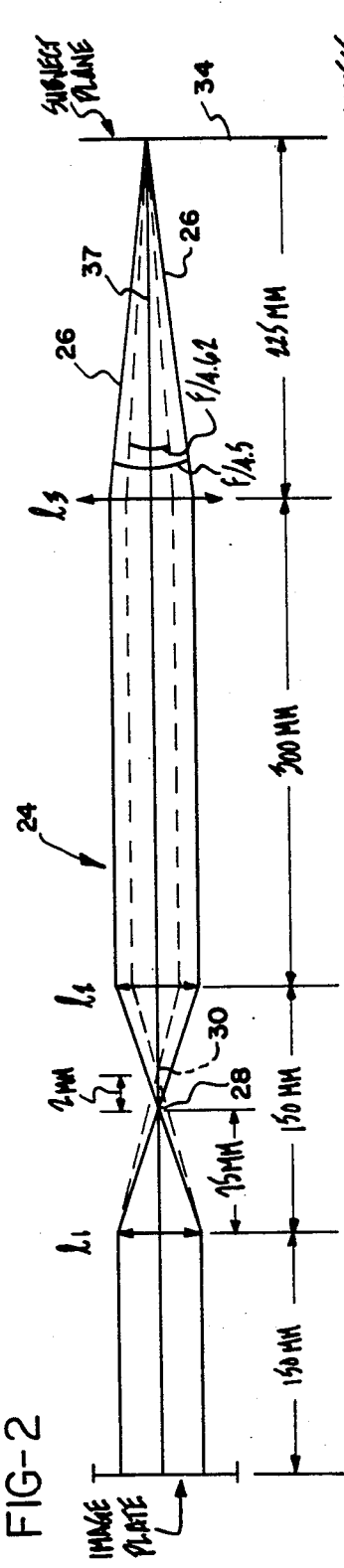
FIG. 2 is a diagram of a hypothetical telescope system, showing the effect of focus error aberration.
Figure 3:
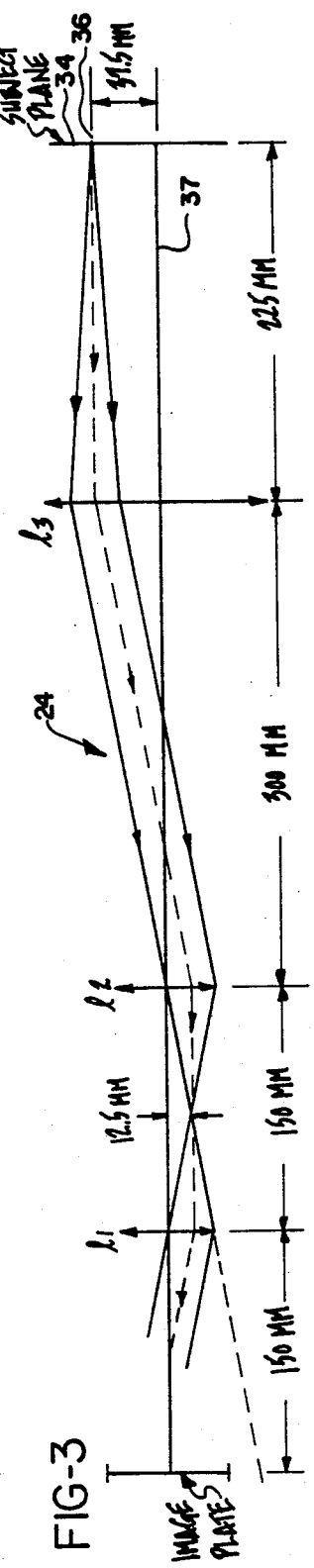
FIG. 3 illustrates the hypothetical telescope system of FIG. 2, showing the effect of vignetting.
Figure 4:
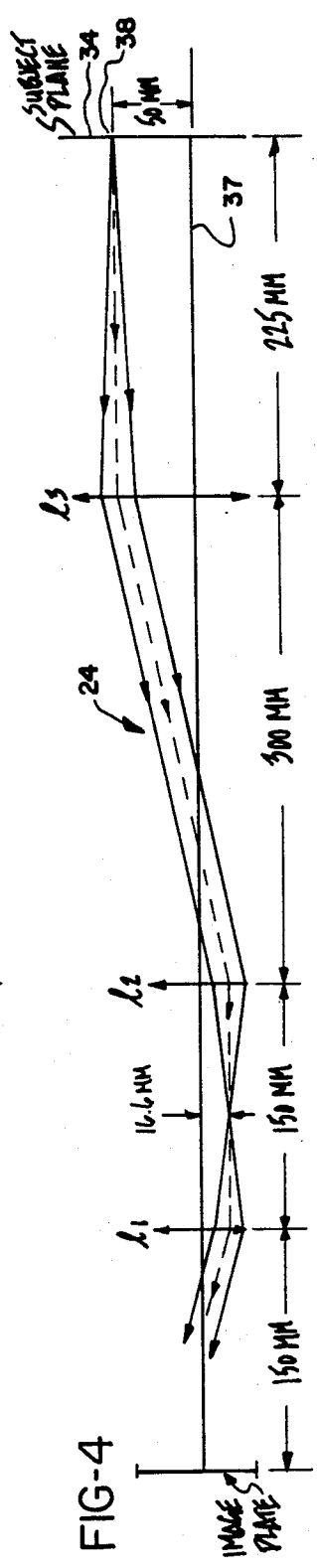
FIG. 4 illustrates the hypothetical telescope system of FIG. 2, again showing the effect of vignetting.

Referring now to the drawings of the preferred embodiments of the invention, and particularly to FIG. 5, a laser 40 provides a source for generating a coherent beam of light 42.

In the preferred embodiment, an argon ion laser operating single frequency at a wavelength of 0.5145 micrometers is used, in particular, a Spectra Physics Model 166-09 Argon Laser. Any laser source, however, whose output wavelength is compatible with the recording medium will work, including but not restricted to helium-neon, krypton, ruby, neodymium YAG or glass, and metal vapor lasers.

Beam 42 is directed by mirrors M1 and M2 into the system 44 and passes through a half-wave plate 46 which allows the angle of polarization to be continuously adjusted before entering the polarizing beamsplitter 48. It should be noted, however, that although polarizing beamsplitting techniques are used in the preferred embodiment to conserve energy and allow maximum flexibility, any beamsplitting technique that divides the incoming beam into two components will work, such as metal films, grating, dielectric films and holographic elements.

Beamsplitter 48 divides the input beam 42 into a subject beam 50 and a reference beam 52 having an intensity ratio determined by the angle of polarization of the incoming beam.

The subject beam 50 is then directed to a means 54 for expanding, filtering and collimating beam 50 including lenses 56 and 58 and a mask having a pinhole 60. It then passes through a second polarizing beamsplitter 62 which serves as a selective beam director. This is accomplished in the following manner: light entering this director (beamsplitter 62) passes through because of the polarization orientation established by beamsplitter 48. Beam 50 then passes through a quarter-wave plate 64 where it is converted from linear to circular polarization. It then strikes a subject 66 and is reflected thereby back through the quarter-wave plate 64 where it is converted back to linear polarization but orthogonally oriented. This causes the subject beam 50 to be reflected by the beamsplitter 62 towards a lens 68 which forms an image in the vicinity of a means for recording the hologram. In the preferred embodiment, lens 68 is a symmetric doublet pair, imaging subject 66 on or near the recording means at one-to-one magnification to maximize the information collected by the lens 68. Other means for directing the subject information to the recording means may be used, including placing the recording means close to the subject and eliminating the imaging system.

While the recording means is shown in the preferred embodiment as a photographic plate 70, it will be recognized that it may be any photo-sensitive material such as photographic films or plates, thermoplastic films, crystalline materials, or any other material capable of recording a hologram.

Figure 6:
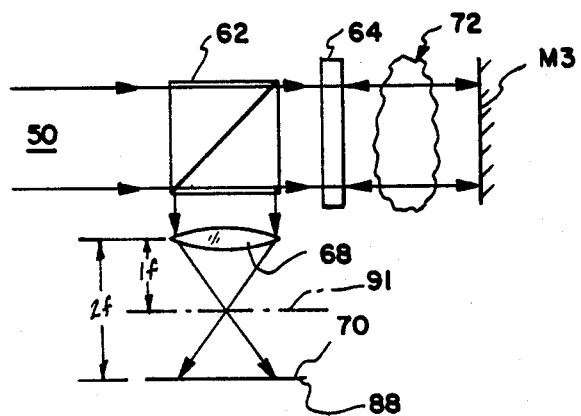
FIG. 6 is a diagram of an alternative embodiment of a portion of the present invention for use when the subject is a transparent or semitransparent volume.

FIG. 6 shows the preferred arrangement if the subject is a transmitting volume 72. Here a mirror M3 is placed behind the subject 72 which causes the subject beam 50 to be reflected back through the quarter wave plate 64. This double pass scheme offers the advantage that anomalies of interest present in a subject volume 72 are illuminated from both the front and the back thus enhancing visibility. When using the invention to make interferometric measurements of optical path changes or differences, double passing the volume doubles the measurement sensitivity.

Figure 7:
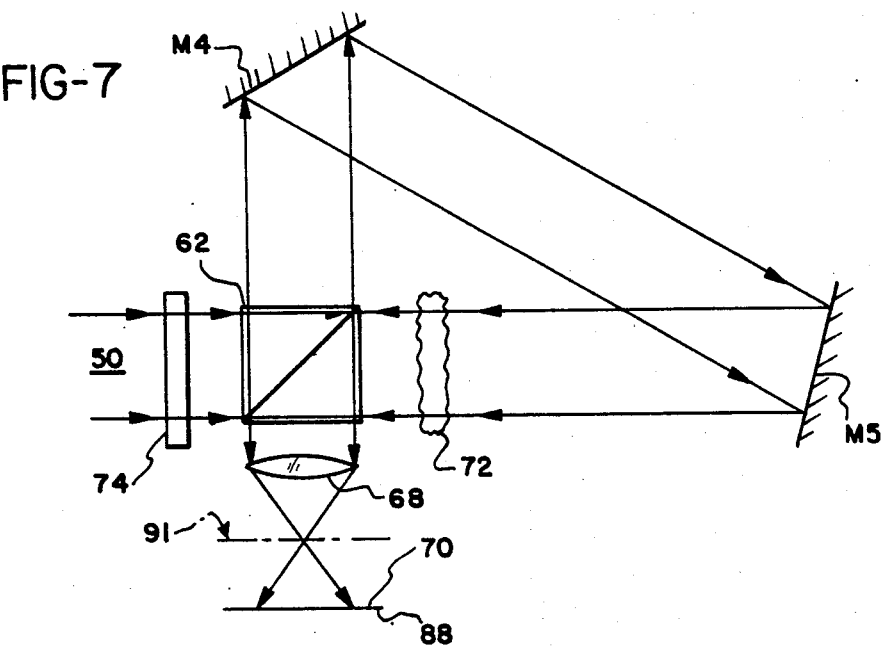
FIG. 7 is a diagram of a further alternative embodiment of a portion of the present invention for use when the subject is a transparent or semitransparent volume.
Figure 8:
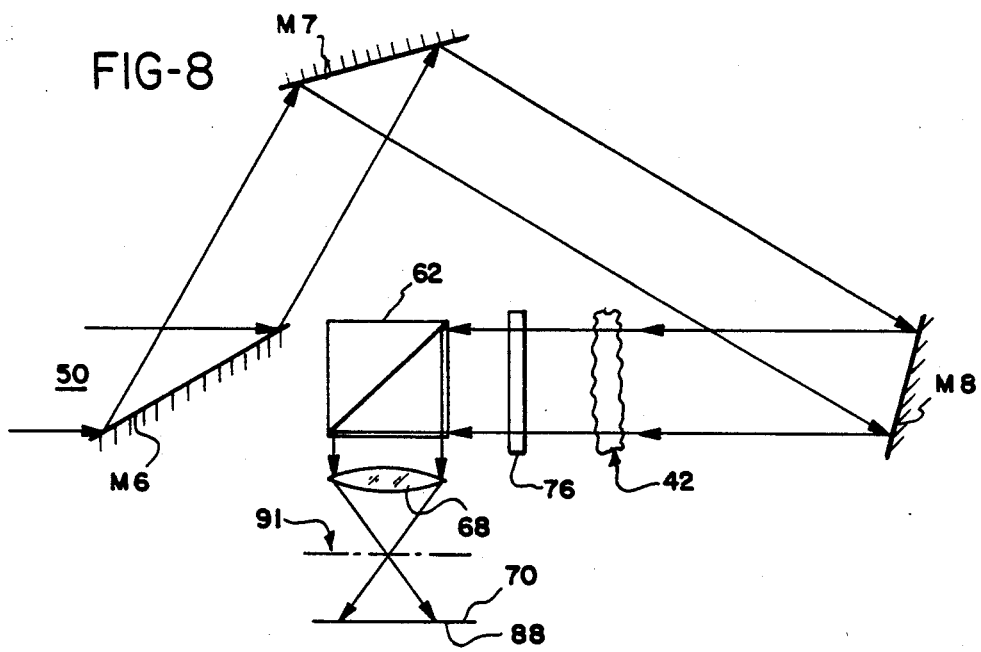
FIG. 8 is a diagram of a still further alternative embodiment of a portion of the present invention for use when the subject is a transparent or semitransparent volume.

The variation shown in FIG. 7, or the more preferred FIG. 8, is used if the double passing or front illumination of a subject volume 72 is undesirable (e.g., in recording or optical processing of transparencies). Referring to FIG. 7, a half-wave plate 74 is placed in the subject beam 50 ahead of polarizing beamsplitter 62. This allows for adjustment of the subject beam polarization angle and is set to provide vertical or s polarization. Beamsplitter 62 now reflects the subject beam 50 toward mirror M4. This mirror directs the beam to mirror M5, where it is directed through the subject or subject volume 72 and back into beamsplitter 62 and thus into lens 68 as described above.

Similarly, in the preferred variation shown in FIG. 8, the subject beam 50 is directed around the beamsplitter 62 by mirrors M6 and M7 where it is directed through the subject 72 and half-wave plate 76 by mirror M8. It then passes through the system to the photographic plate 70 as previously described.

Referring back to FIG. 5, the reference beam 52 generated from beamsplitter 48 is directed by mirror M9 towards a means 78 for expanding, filtering and collimating beam 52 consisting of lenses 80 and 82, and a mask having a pinhole 84. Beam 52 is expanded and collimated and directed towards mirror M10. In the recording mode, mirrors M10 and M11 direct the reference beam 52 along reference path 86 to the photographic plate 70 where beam 52 combines with the subject beam 50 to expose plate 70, whereupon a hologram 88 is formed in plate 70.

After processing the hologram 88 and returning it to position, mirror M10 is removed and mirror M12 directs the reference beam 52 towards the hologram 88 from the conjugate direction along conjugate path 90. Subject information from hologram 88 will then exactly reverse ray-trace back through lens 68 and beamsplitter 62 following the same path but in the reversed direction as the original subject beam 50 during recording. A three-dimensional image of the subject 66 will be formed at its original location. Because of the exact reverse ray-trace feature, optical distortions or aberrations introduced by optical elements such as lens 68, beamsplitter 62, or the like will be eliminated, providing a diffraction limited three-dimensional real image.

Because collimated coherent light is used to illuminate the subject in conjunction with a focussing element, an optical Fourier transform of subject information is formed in each of the embodiments of FIGS. 5-8 between the hologram 88 and the lens 68, one focal length from the focussing element, as seen for example at 91 in FIG. 6. This transform plane 91 can be used to manipulate subject information such as spatial frequency content, distribution, and phase, by placing appropriate phase and blocking filters at this location. Such filters may be of any of the presently known optical filters, examples of which are disclosed in U.S. Pat. No. 4,000,949, issued Jan. 4, 1977, to Watkins, and U.S. Pat. No. 4,299,443, issued Nov. 10, 1981, to Minami et al. This serves to optically process subject information and can be performed prior to initial recording of the hologram or after the hologram has been recorded. In either case, the present invention offers several advantages over standard optical processors.

First, the inverse Fourier transform is performed by the same optics that produced the original transform because of the reverse ray-trace feature of this process. Second, the optical quality of the imaging optic need only be sufficient to separate spatial frequencies at the Fourier transform plane relating to the desired image information. This significantly reduces the cost and broadens the applications for optical processing. In general, the Fourier transform is less sensitive to lens aberrations than the image. Finally, the same apparatus may be used to produce effective blocking filters on photosensitive material such as photographic plates, which are accurately matched to the subject's spatial frequency locations in the Fourier transform plane.

Figure 9:
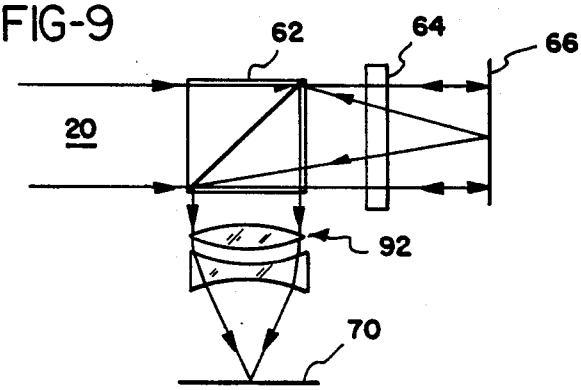
FIG. 9 is a diagram of an alternative embodiment of a portion of the present invention for recording an image plane hologram.
Figure 10:
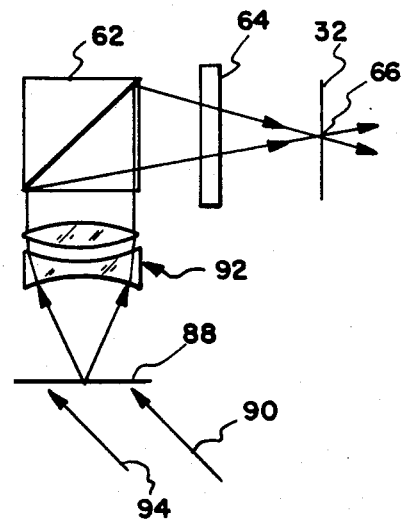
FIG. 10 is a diagram showing image reconstruction with the embodiment of FIG. 9.

In the variation shown in FIG. 9, when the subject 66 or a portion thereof is flat (for example, an integrated circuit mask), the lens used is color corrected (for example, achromat 92), and if care is taken to image the subject 66 on the surface of the plate 72, an image plane hologram is recorded. This image plane hologram can then be illuminated for reconstruction with a broadband source such as white light. This technique offers the advantage that incoherent source illumination will eliminate coherent noise in the reconstructed image. Reconstruction is illustrated in FIG. 10 where the hologram 88 is illuminated with a broadband beam 94 along the conjugate path 90. Reconstruction of the image point will occur at the original subject position 96.

There may be background noise in the holographic image which is not located at the subject plane. If the reference beam's angle of incidence is changed slightly during image reconstruction, this dislocated background noise moves across the field of view while the image is stationary. Therefore, much of this background noise originates from other optical components in the system. Dithering the reference beam 52 while viewing or photographing the holographic image smoothes out the dislocated background and increases the effective contrast. However, this is effective only for a single plane in the reconstructed image, because only a single-image plane of the subject can be exactly imaged in the plane of the hologram. Points in the reconstruction corresponding to points off the hologram are displaced with dithering of the reference beam 52 and will smear out.

In the preferred embodiment, hologram 88 is formed in an Agfa 8E56HD 4"×5" plate. The preferred developing processes, as experimentally determined, are either PAAP or HRP/Bromine Methanol. These were found to give substantially better results than standard D-19 processing.

The lens 68 described herein collects approximately an F/3.5 cone of light. Thus, the reconstructed real holographic image is diffraction limited in resolution for the F/3.5 optical system:

diffraction limited
diameter=2.44$\lambda$(F-number).=2.44(0.5145 $\mu$m)(3.5)=4.4 microns.

In experimental testing of the system, however, it appears that resolution of the holographic image better than four microns is attainable.

Because of the high resolution obtained with the presently disclosed system, documentation of the microstructure of a subject is readily facilitated. The reconstructed image may be studied microscopically at the original subject plane through an appropriate means therefor, such as microscope 98 shown in FIG. 5. Moreover, the observed information may be recorded, for example, by a camera (not shown) or other means, used in conjunction with microscope 98.

Real time holographic interferometric analysis of the subject may be accomplished by first recording a hologram with the apparatus arranged as in any of FIGS. 5-9, depending on the subject type. The developed hologram 88 is then replaced in its original position, with the aid of a kinematic mount, and illuminated with the recording reference beam 52 with mirror M10 in place. Viewing would occur from the position indicated by arrow 100 (FIG. 5).

If either the original subject 66 or 72, or some new subject to be compared, is simultaneously illuminated with light from subject beam 50, and made equal in intensity to the holographic image intensity by adjusting half-wave plate 46, then differences in subject optical paths will be observed as fringes appearing on or near the subject. These optical path differences are referenced to the subject as originally recorded.

A diffraction limited interferogram can be reconstructed in the following manner. A double-exposed hologram is recorded by first recording a hologram of the subject in its reference state. Changes to the subject are then made or a different subject is inserted, and a second hologram is recorded on the same holographic plate. After processing and replacement to its original position, it is then illuminated by reference beam 52 from the back or conjugate direction 90 via mirror M12. Both holographic images will then reconstruct at the original subject position and can be viewed therefrom. Optical path differences due to changes in the subject occurring between exposures or differences between the two subjects will be observed as fringes on or near the reconstructed subject's image. Since this interferogram is inherently diffraction limited, due to the reverse ray-trace feature, extremely small fringe spacings can be accurately measured through a magnifying device, such as microscope 98.

The subject can be compared to an unperturbed reference wavefront in the following manners. A hologram 88 is made of the subject, processed, repositioned at its original location, and reilluminated with the reference beam 52 from the conjugate direction 90 via mirror M12. A second reference beam is then combined with the real holographic image at the original subject location via the path of original subject beam 50 and beam director 62. If the intensities are then made equal by adjusting half-wave plate 46, a fringe pattern can be observed. This fringe pattern will map the difference in optical path between the surface figure or optical density of the subject and the wavefront shape of the reference wavefront.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. Apparatus for the production of a holographic image of a subject disposed at a subject plane, comprising:
   a source for generating a substantially coherent beam of light;
   a beamsplitter for dividing said beam into a subject beam and a reference beam;
   means for recording a hologram of said subject thereon;
   a lens for passing therethrough light from said subject beam reflected by said subject, and focussing said light onto or near one side of said recording means;
   means for directing said reference beam to said one side of said recording means at a predetermined angle of incidence thereon; and
   means for selectively redirecting said reference beam, following recording of said hologram on said recording means, to the opposite side of said recording means in a conjugate direction for diffraction thereby into said lens in a direction exactly opposite to that travelled by said subject beam therethrough, for reconstruction of said holographic image at said subject plane, said redirecting means being constructed so that selective operation thereof requires no change in the positioning or orientation of any of said source, said beamsplitter, said recording means, said lens, or any portion of said directing means not common with said redirecting means.

2. Apparatus as defined in claim 1 wherein said means for recording a hologram of said subject thereon is a photographic plate.

3. The apparatus defined in claim 1 further comprising a second beamsplitter disposed along the path of said subject beam, and a quarter-wave plate disposed along said subject beam path between said second beamsplitter and said subject, said second beamsplitter being oriented with respect to said subject beam path such that said beam passes directly therethrough from said source to said subject, but following reflection by said subject is deflected by said beamsplitter into said lens.

4. The apparatus defined in claim 1 or 3 further comprising means for microscopically examining said image reconstructed at said subject plane.

5. The apparatus defined in claim 1 or 3 further comprising means for expanding and collimating said subject and said reference beams, said expanding and collimating means including a pair of lenses disposed within each beam path and a pair of masks each having a pinhole defined therein, each said pinhole being disposed at the focal point defined by and disposed between said lenses of each of said pairs.

6. The apparatus defined in claim 1 or 3 further comprising a second mirror, disposed on an opposite side of said subject from the incidence of said subject beam thereon and perpendicular to said beam path, such that in the event said subject constitutes a transparent or semi-transparent volume, said beam is passed through said volume, reflected by said second mirror, through said volume in an opposite direction, and to said lens.

7. The apparatus as defined in claim 1 further comprising:
   means for directing said subject beam to a side of said subject opposite said source, such that in the event said subject constitutes a transparent or semi-transparent volume, said beam is passed through said volume;
   a half-wave plate disposed for rotation of the plane of polarization of said subject beam following passage thereby through said volume; and
   a second beamsplitter disposed for deflecting said repolarized subject beam into said lens.

8. Apparatus for the production of a holographic image of a subject disposed at a subject plane, comprising:
   a source for generating a substantially coherent beam of light;
   a first beamsplitter for dividing said beam into a subject beam and a reference beam;
   means for expanding and collimating said subject and said reference beams, said expanding and collimating means including a pair of lenses disposed within each beam path and a pair of masks each having a pinhole defined therein, each said pinhole being disposed at the focal point defined by and disposed between said lenses of each of said pairs;
   a second beamsplitter disposed along the path of said subject beam, said second beamsplitter being oriented with respect to said subject beam path such that said beam passes directly therethrough from said source to said subject;
   a quarter-wave plate disposed along said subject beam path between said second beamsplitter and said subject such that said beam passes therethrough from said second beamsplitter to said subject, is reflected by said subject, passes through said quarter-wave plate, and is deflected by said second beamsplitter;
   a photographic plate;
   a lens for passing therethrough light from said subject beam deflected by said second beamsplitter, and focussing said light onto or near one side of said photographic plate;
   means for directing said reference beam to said one side of said photographic plate at a predetermined angle of incidence thereon, said means including at least one mirror;
   said mirror being removable, whereupon following exposure and processing of said photographic plate, said reference beam is directed to the opposite side of said photographic plate in a conjugate direction for diffraction thereby into said lens in a direction exactly opposite to that travelled by said subject beam therethrough, for reconstruction of said holographic image at said subject plane;
   said lens further operating to form a Fourier transform of said image at a plane disposed between said photographic plate and said lens;
   an optical filter removably disposed at said Fourier transform plane; and means for microscopically examining said image reconstructed at said subject plane.

9. Apparatus as defined in claim 1, 3 or 7 wherein one of said directing or said redirecting means includes a removable mirror, disposition of said mirror causing said reference beam to be guided by one of said directing or said redirecting means, and removal of said mirror causing said reference beam to be guided by the other of said directing or said redirecting means.

* * * * *

UNITED STATES PATENT AND TRADEMARK OFFICE
CERTIFICATE OF CORRECTION

PATENT NO. : 4,478,481
DATED : Oct. 23, 1984
INVENTOR(S) : Fusek et al

It is certified that error appears in the above-identified patent and that said Letters Patent is hereby corrected as shown below:

Col. 2, the formula appearing between lines 47-53 as $$\text{"} \quad OTF = H(f_x, f_y) = \frac{\underset{a(f_x,f_y)}{\iint} d\xi d\eta}{\underset{a(o,o)}{\iint} d\xi d\eta} \quad \text{"}$$

should read --

$$OTF = H(f_x, f_y) = \frac{\underset{a(f_x, f_y)}{\iint} d\xi d\eta}{\underset{a(o,o)}{\iint} d\xi d\eta} \quad --.$$

Col. 2, line 60, through Col. 3, line 5, the formula appearing as:

$$P\left(\xi - \frac{\lambda d f_x}{2}, \eta - \frac{\lambda d f_y}{2}\right) \text{ and } P\left(\xi + \frac{\lambda d f_x}{2}, \eta + \frac{\lambda d f_y}{2}\right)$$

$$\text{is } H'(f_x, f_y) =$$

$$\underset{a(f_x,f_y)}{\iint} \exp\left(ik\left[W\left(\xi + \frac{\lambda d f_x}{2}, \eta + \frac{\lambda d f_y}{2}\right) - \right.\right.$$

-continued $$\left.\left. W\left(\xi - \frac{\lambda d f_x}{2}, \eta - \frac{\lambda d f_y}{2}\right)\right]\right) d\xi d\eta \bigg/ \underset{a(o,o)}{\iint} d\xi d\eta$$

UNITED STATES PATENT AND TRADEMARK OFFICE
CERTIFICATE OF CORRECTION

PATENT NO. : 4,478,481
DATED : Oct. 23, 1984
INVENTOR(S) : Fusek et al

Page 2 of 3

It is certified that error appears in the above-identified patent and that said Letters Patent is hereby corrected as shown below:

should be --

$$P\left(\xi - \frac{\lambda d_i f_x}{2}, \eta - \frac{\lambda d_i f_y}{2}\right) \text{ and } P\left(\xi + \frac{\lambda d_i f_x}{2}, \eta + \frac{\lambda d_i f_y}{2}\right)$$

$$\text{is } H'(f_x, f_y) = \iint_{a(f_x,f_y)} \exp\left\{ik\left[W\left(\xi + \frac{\lambda d_i f_x}{2}, \eta + \frac{\lambda d_i f_y}{2}\right) - W\left(\xi - \frac{\lambda d_i f_x}{2}, \eta - \frac{\lambda d_i f_y}{2}\right)\right]\right\} d\xi d\eta \bigg/ \iint_{a(o,o)} d\xi d\eta$$

UNITED STATES PATENT AND TRADEMARK OFFICE
CERTIFICATE OF CORRECTION

PATENT NO. : 4,478,481  
DATED : Oct. 23, 1984  
INVENTOR(S) : Fusek et al

It is certified that error appears in the above-identified patent and that said Letters Patent is hereby corrected as shown below:

The formula appearing at Col. 3, lines 8-14 as $$|\int\int XY d\xi d\eta|^2 \leq (\int\int |X|^2 d\xi d\eta)(\int\int |Y|^2 d\xi d\eta)$$

can be used to show directly that $$|H(f_x,f_y)_{aber.}|^2 \leq |H(f_x,f_y)|^2 \text{ no aberrations}$$

should be --

$$\left|\int\int X\ Y\ d\xi, d\eta\right|^2 \leq (\int\int |X|^2\ d\xi, d\eta)\ (\int\int |Y|^2\ d\xi, d\eta)$$

can be used to show directly that $$\left|H'(f_x,f_y)_{aber.}\right|^2 \leq \left|H(f_x,f_y)\right|^2 \text{ no aberrations}$$

Signed and Sealed this

Twenty-third Day of July 1985

[SEAL]

Attest:

DONALD J. QUIGG

Attesting Officer    Acting Commissioner of Patents and Trademarks